(12) United States Patent
Nadot et al.

(10) Patent No.: US 6,696,770 B2
(45) Date of Patent: Feb. 24, 2004

(54) INDUCTION HEATING OR MELTING POWER SUPPLY UTILIZING A TUNING CAPACITOR

(75) Inventors: Vladimir V. Nadot, Voorhees, NJ (US); Oleg S. Fishman, Maple Glen, PA (US)

(73) Assignee: Inductotherm Corp., Rancocas, NJ (US)

(*) Notice: Subject to any disclaimer, the term of this patent is extended or adjusted under 35 U.S.C. 154(b) by 0 days.

(21) Appl. No.: 10/217,081

(22) Filed: Aug. 12, 2002

(65) Prior Publication Data

US 2003/0035309 A1 Feb. 20, 2003

Related U.S. Application Data

(60) Provisional application No. 60/312,159, filed on Aug. 14, 2001.

(51) Int. Cl.⁷ .................................................. H02J 3/00
(52) U.S. Cl. ..................... 307/17; 219/662; 219/666; 219/671; 373/147
(58) Field of Search ........................ 307/17, 11, 31; 219/660, 661, 662, 666, 671; 373/144, 147, 148

(56) References Cited

U.S. PATENT DOCUMENTS

| | | | | |
|---|---|---|---|---|
| 4,426,564 A | * | 1/1984 | Steigerwald et al. | 219/624 |
| 5,968,398 A | * | 10/1999 | Schmitt et al. | 219/626 |
| 6,546,039 B2 | * | 4/2003 | Fishman et al. | 373/146 |

FOREIGN PATENT DOCUMENTS

DE     195 27 827 C2     1/1997

* cited by examiner

*Primary Examiner*—Shawn Riley
(74) *Attorney, Agent, or Firm*—Philip O. Post

(57) ABSTRACT

A rectifier/inverter power supply for use with induction heating or melting apparatus includes a tuning capacitor connected across the output of the rectifier and input of the inverter. The tuning capacitor forms a resonant circuit with an inductive load coil at the operating frequency of the inverter. Additionally, the load coil may be formed from an active load coil connected to the output of the inverter and a passive load coil, in parallel with a resonant tuning capacitor.

14 Claims, 7 Drawing Sheets

LEGEND:
16 – COIL TUNING CAPACITOR SECTION OF POWER SUPPLY
L9 – INDUCTION LOAD COIL
L8 – CURRENT LIMITING REACTOR

INDUCTION HEATING OR MELTING POWER SUPPLY UTILIZING A TUNING CAPACITOR

CROSS REFERENCE TO RELATED APPLICATIONS

This application claims the benefit of U.S. Provisional Application No. 60/312,159, filed Aug. 14, 2001.

FIELD OF THE INVENTION

The present invention relates to an ac power supply for use in induction heating or melting applications wherein the induction power circuit is resonantly tuned.

BACKGROUND OF THE INVENTION

Figure 1:
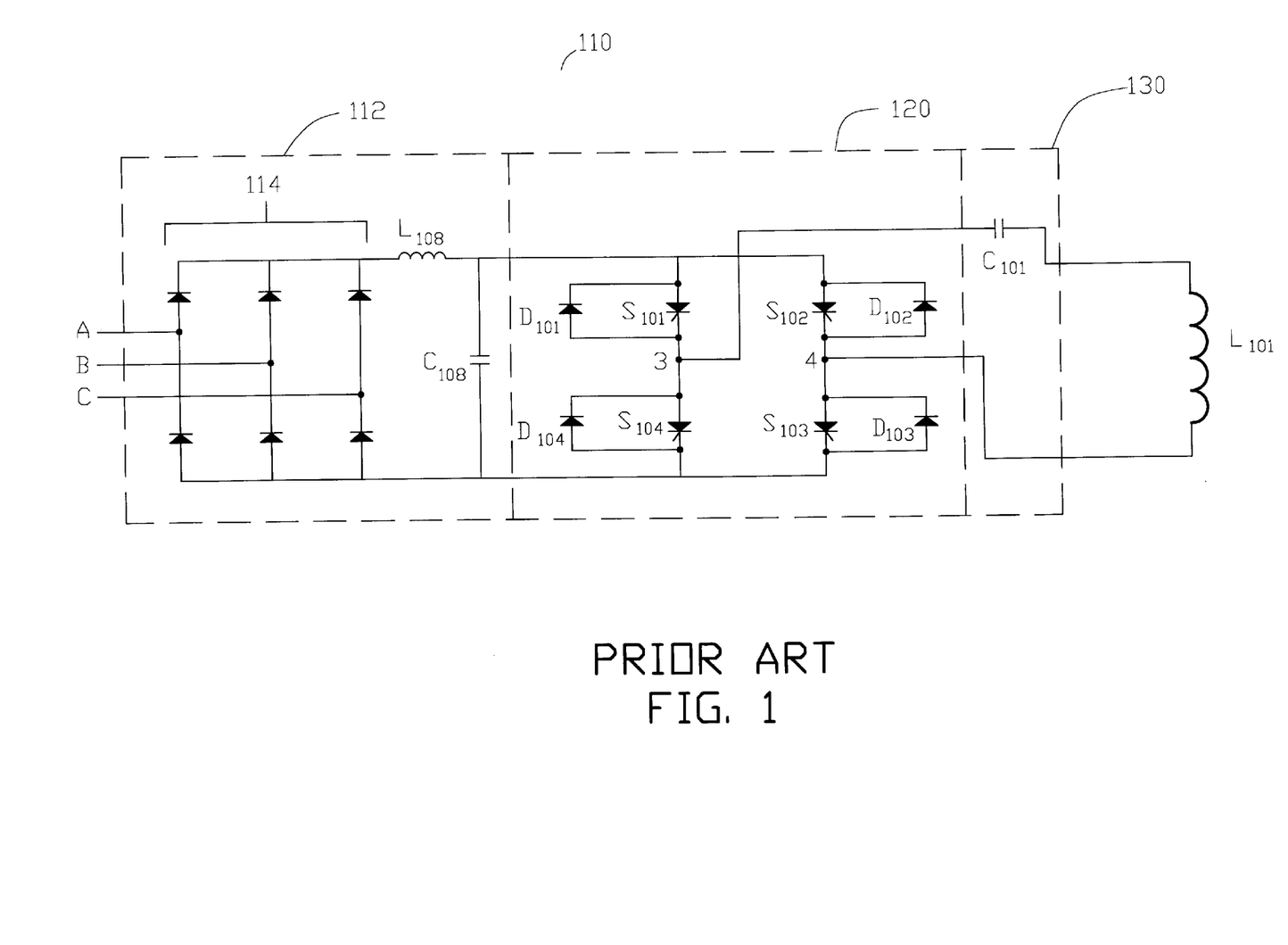
FIG. 1 is a schematic diagram of a prior art power supply with a full-bridge inverter that is used in induction heating and melting applications.

FIG. 1 illustrates a conventional power supply 110 that is used in induction heating or melting applications. The power supply consists of an ac-to-dc rectifier and filter section 112, a dc-to-ac inverter section 120 and a tuning capacitor section 130. For the power supply shown in FIG. 1, a three-phase diode bridge rectifier 114 converts three-phase (A, B, C) ac utility line power into dc power. Current limiting reactor $L_{108}$ smoothes out the ripple in the output dc current of the rectifier, and capacitor $C_{108}$ filters the ac component from the output dc voltage of the rectifier. The filtered dc output of the rectifier is inverted to ac by a full-bridge inverter consisting of solid state switches $S_{101}$, $S_{102}$, $S_{103}$ and $S_{104}$ and associated antiparallel diodes $D_{101}$, $D_{102}$, $D_{103}$ and $D_{104}$, respectively. Alternating turn-on/turn-off cycles of switch pairs $S_{101}/S_{103}$ and $S_{102}/S_{104}$ produce a synthesized ac inverter output at terminals 3 and 4.

Induction load coil $L_{101}$ represents the power coil used in the induction heating or melting application. For example, in an induction furnace, load coil $L_{101}$, is wound around the exterior of a crucible in which metal charge has been placed. In an induction heating application, a metal workpiece, such as a strip or wire, may travel through a helical winding of load coil $L_{101}$ or otherwise be brought near to the coil to inductively heat the workpiece. Current supplied by the power supply and flowing through load coil $L_{101}$ creates a magnetic field that either directly heats the metal charge or workpiece by magnetic induction, or heats the workpiece by heat conduction from a susceptor that is heated by magnetic induction. Load coil $L_{101}$, whether it be a single coil or an assembly of interconnected coil sections, has a very low operating power factor. Because of this, a tuning capacitor (or bank of capacitors), such as capacitor $C_{101}$ must be provided in the load coil circuit to improve the overall power factor of the load coil circuit. These tuning capacitors are a significant cost and volume component of the power supply. Therefore, there exists the need for a power supply for inductive heating or melting applications that utilizes smaller and less costly tuning capacitors.

An objective of the present invention is to provide a power supply for inductive heating or melting applications that utilizes a capacitor connected between the output of the rectifier and the input of the inverter to form a resonantly tuned circuit with the induction load coil used in the application.

BRIEF SUMMARY OF THE INVENTION

In one aspect, the present invention is apparatus for, and a method of, providing a power supply with rectifier and inverter sections for use with an induction load coil wherein a tuning capacitor is provided across the output of the rectifier and the input of the inverter to form a resonant circuit with the induction load coil. The induction load coil may comprise an active load coil connected to the output of the inverter, and a passive load coil connected in parallel with a capacitor to form a tank circuit. Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 2:
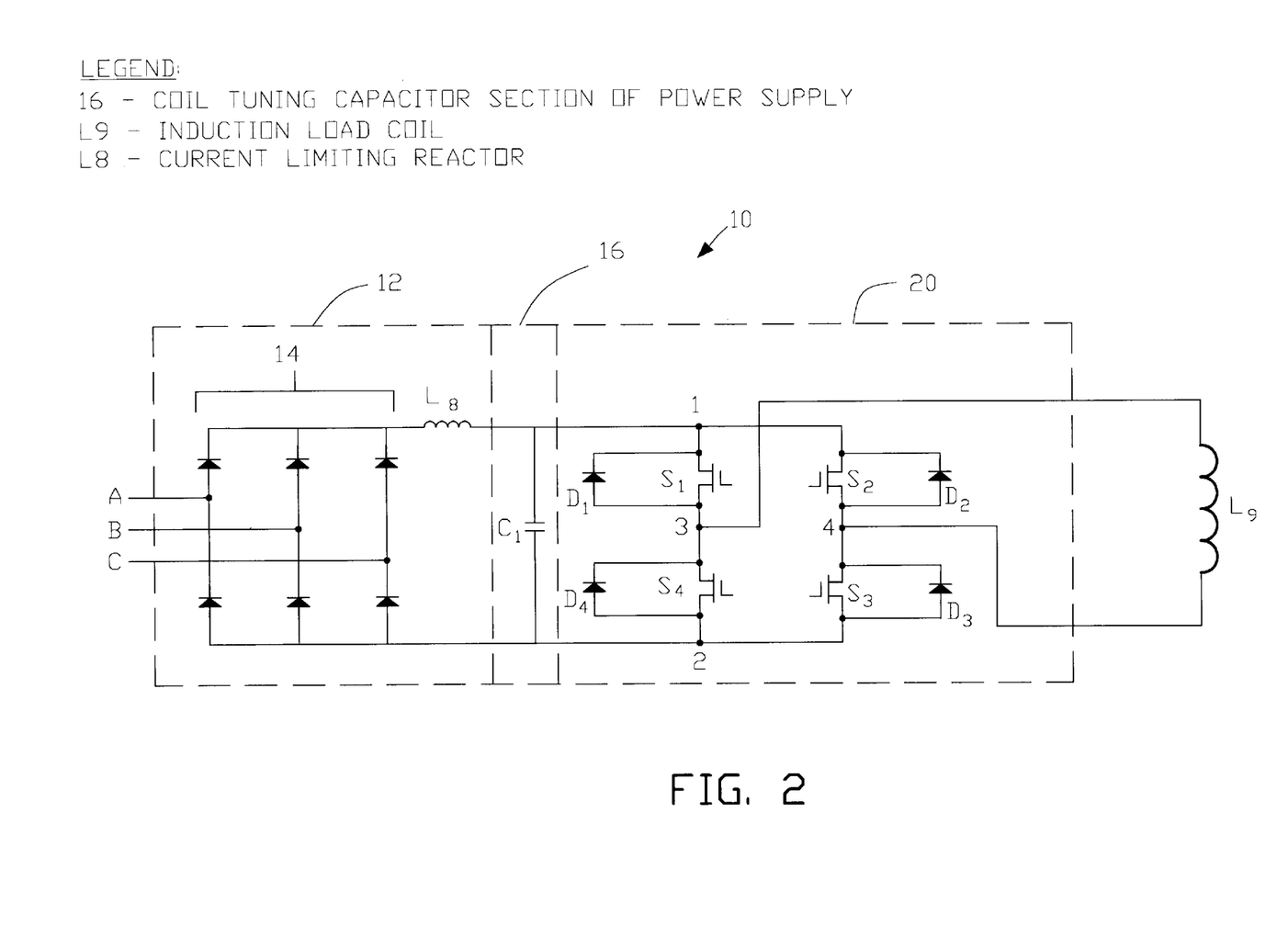
FIG. 2 is a schematic diagram of one example of the power supply of the present invention for use in induction heating or melting applications.

Referring to the drawings, wherein like numerals indicate like elements, there is shown in FIG. 2 an illustration of one example of power supply 10 of the present invention for use in induction heating or melting applications. Ac-to-dc rectifier and filter section 12 includes an ac-to-dc rectifier. A multi-phase rectifier, in this non-limiting example of the invention, a three-phase diode bridge rectifier 14 is used to convert three-phase (A, B, C) ac utility line power into dc power. Optional current limiting reactor $L_8$ smoothes out the ripple from the output dc current of the rectifier. Section 16 of the power supply diagrammatically illustrates coil tuning capacitor $C_1$, which can be a single capacitor or a bank of interconnected capacitors that form a capacitive element.

In FIG. 2, the dc output of the rectifier is supplied to input terminals 1 and 2 of a full-bridge inverter in inverter section 20. The inverter consists of solid state switches $S_1$, $S_2$, $S_3$ and $S_4$ and associated antiparallel diodes $D_1$, $D_2$, $D_3$ and $D_4$, respectively. Alternating turn-on/turn-off cycles of switch pairs $S_1/S_3$ and $S_2/S_4$ produce a synthesized ac inverter output at terminals 3 and 4. A preferred, but not limiting, choice of component for the solid state switch is an isolated gate bipolar transistor (IGBT), which exhibits the desirable characteristics of power bipolar transistors and power MOSFETs at high operating voltages and currents. In one example of the invention, the inverter employs a phaseshifting scheme (pulse width control) relative to the turn-on/turn-off cycles of the two switch pairs whereby variable overlapping on-times for the two switch pairs is used to vary the effective RMS output voltage of the inverter.

Induction load coil $L_9$ represents the power coil used in the induction heating or melting apparatus. The capacitance of capacitor $C_1$ is selected to form a resonant circuit with the impedance of load coil $L_9$ at the operating frequency of the inverter, which is the switching rate of the switch pairs used in the inverter. Consequently, a tuning capacitor is not required at the output of the inverter. Selection of available circuit components may not allow operation exactly at resonance, but as close to resonance as is achievable with available components. The ac current flowing through induction load coil $L_9$ from the output of the inverter magnetically couples with an electrically conductive material, which may be, for example, a conductive metal or a susceptor.

Figure 3:
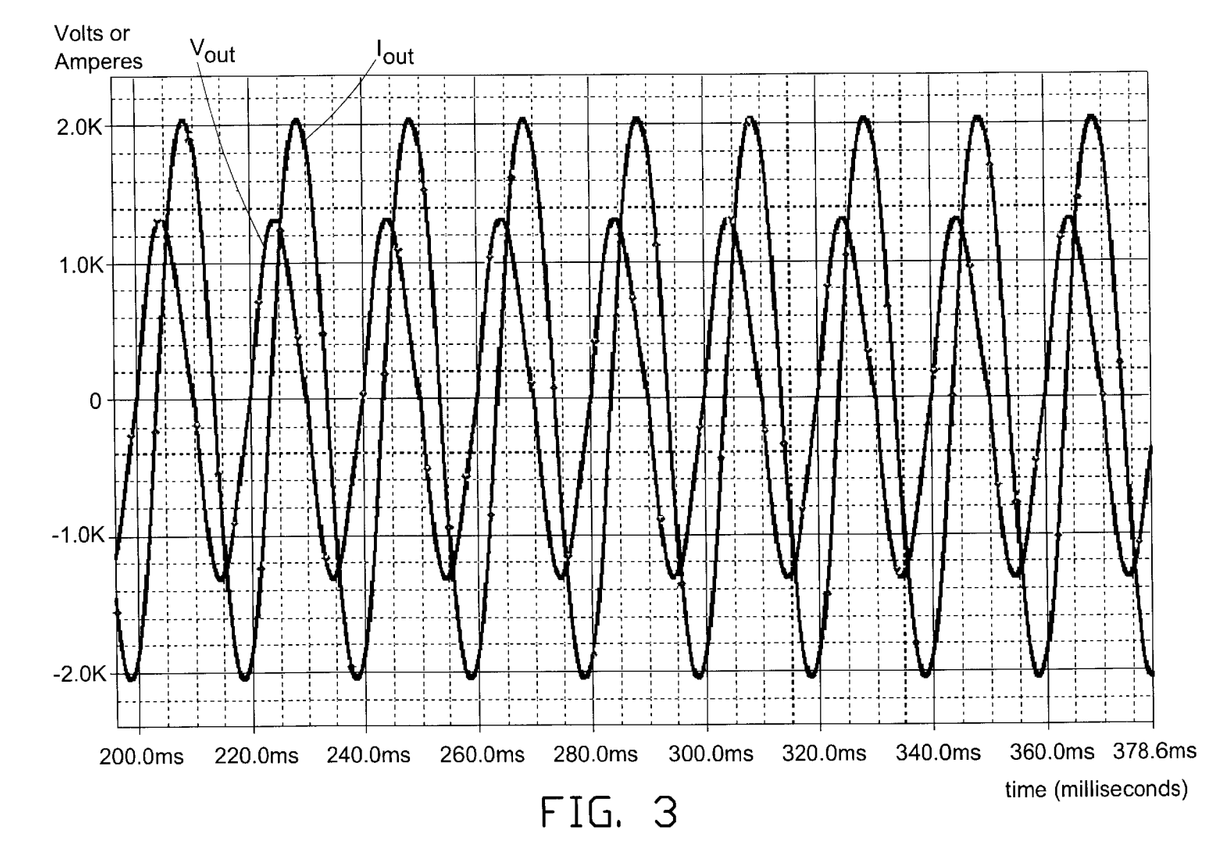
FIG. 3 is a waveform diagram illustrating the inverter's output voltage and current for one example of the power supply of the present invention.
Figure 4:
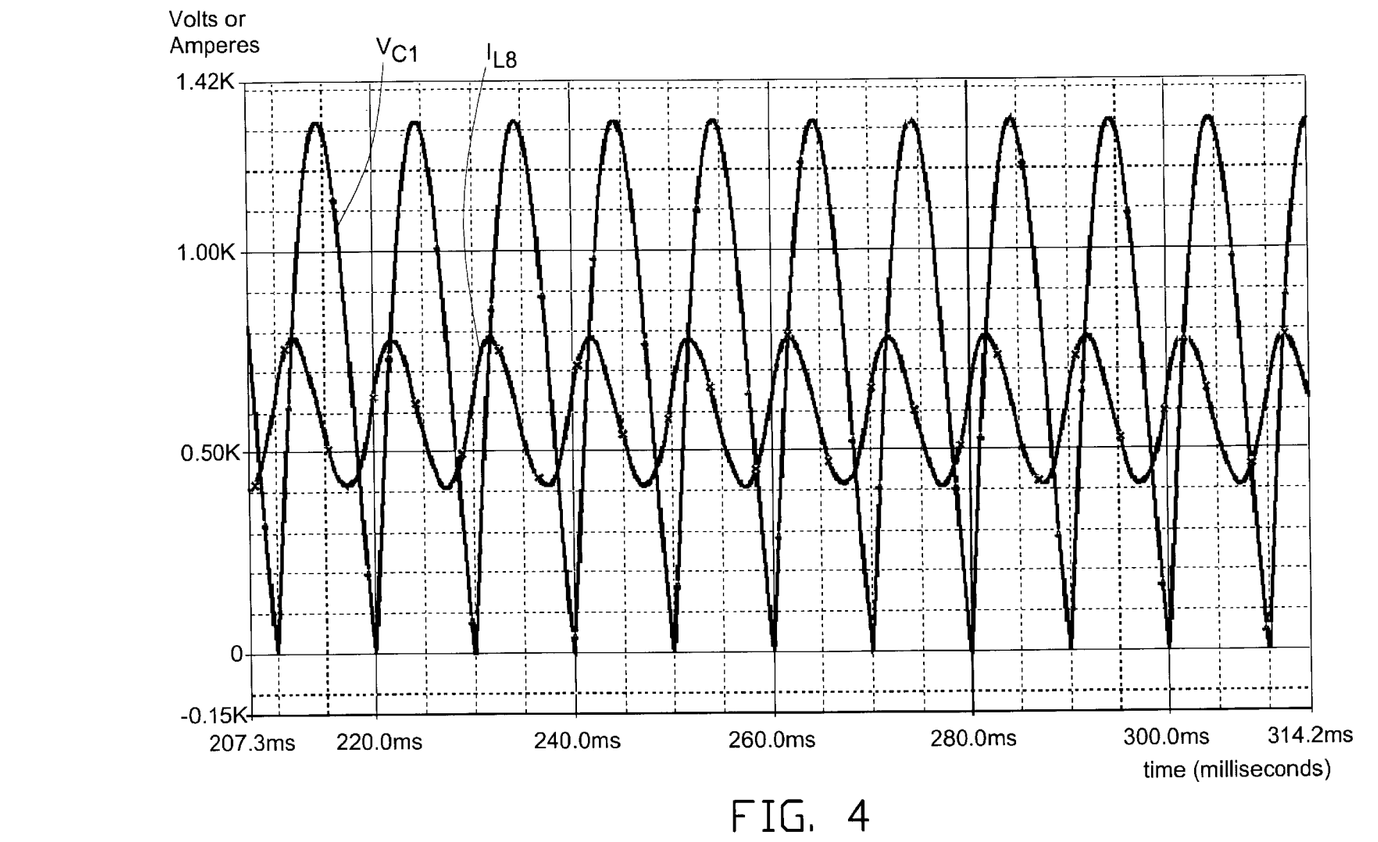
FIG. 4 is a waveform diagram illustrating the voltage across a tuning capacitor and the current through a line filtering reactor used in one example of the power supply of the present invention.
Figure 5:
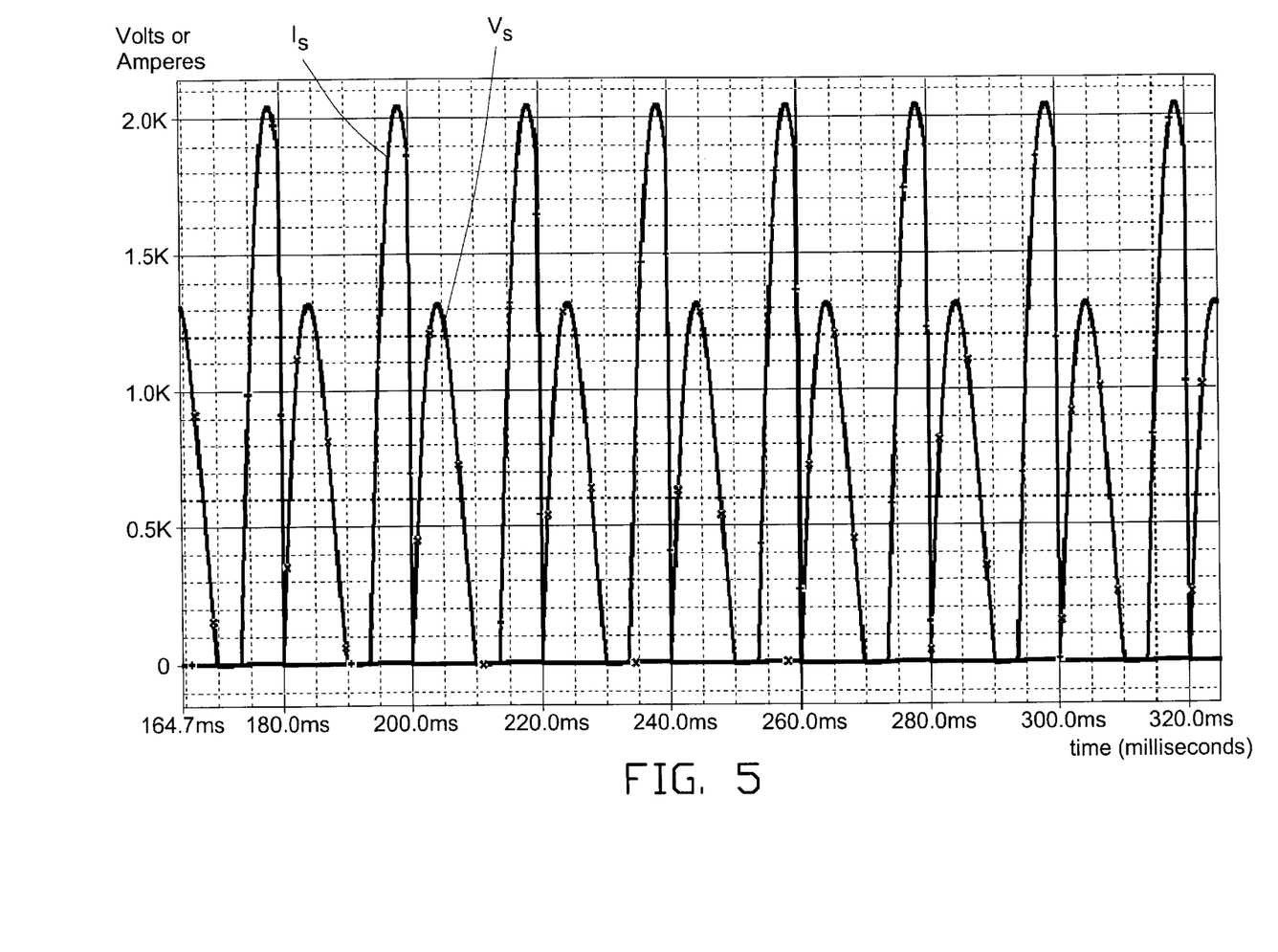
FIG. 5 is a waveform diagram illustrating the voltage across, and current through, a switching device used in the inverter in one example of the power supply of the present invention.

FIG. 3 through FIG. 5 illustrate the performance characteristics for power supply 10 of the present invention as shown in FIG. 2 with input utility line power (A, B, C) of 480 volts line-to-line, 60 Hertz, and inverter 20 operating at an output frequency of 60 Hz. For this particular non-limiting example: $L_8$ is selected as 5,000 $\mu$H (for an impedance of 3.77 ohms at the rectifier ripple output frequency of 120 Hz); $C_1$ is selected as 5,000 $\mu$F (for an impedance of 0.27 ohms at the rectifier ripple output frequency of 120 Hz); and $L_9$ is selected as 1,000 $\mu$H (for an impedance of 0.38 ohms at the inverter output frequency of 60 Hz). Not shown in FIG. 2, but used in this sample analysis is a resistance of 0.16 ohms for induction load coil $L_9$. Operating the $C_1/L_9$ circuit at resonance for the output frequency of inverter 20 results in a substantially sinusoidal inverter output voltage, $V_{out}$, and output current, $I_{out}$ (at terminals 3 and 4), as graphically illustrated in FIG. 3. FIG. 4 graphically illustrates that the voltage across capacitor $C_1$, namely $V_{C1}$, is driven to its limiting lower value of zero volts as a result of capacitor $C_1$ being in resonance with coil $L_9$ at the ripple frequency of 120 Hz. $V_{C1}$ is the applied voltage to the input of inverter 20 (at terminals 1 and 2). FIG. 4 also illustrates the ripple current, $I_{L8}$, through reactor $L_8$. The impedance of reactor $L_8$ is generally selected to be much greater than the impedance of $C_1$ to block feedback of harmonics from the inverter circuit to the rectifier's power source. FIG. 5 graphically illustrates the voltage, $V_s$, across one of the solid state switches in inverter 20, and the current, $I_s$, through one of the switches at maximum power output when there is zero overlap angle between $V_s$ and $I_s$. Switching device turn-off at zero volts for $V_s$ when dc ripple has reached zero (e.g., at 240.0 milliseconds (ms) in FIG. 4 and FIG. 5), will minimize switching loses. Additionally, since switching commutation occurs at zero voltage in this example, any spikes due to stray circuit inductance will be significantly less than in a conventional inverter having low ac ripple current in the dc link voltage. This specific example is provided to illustrate the practice of the invention, which is not limited to the specific elements and values used in this example.

Figure 6:
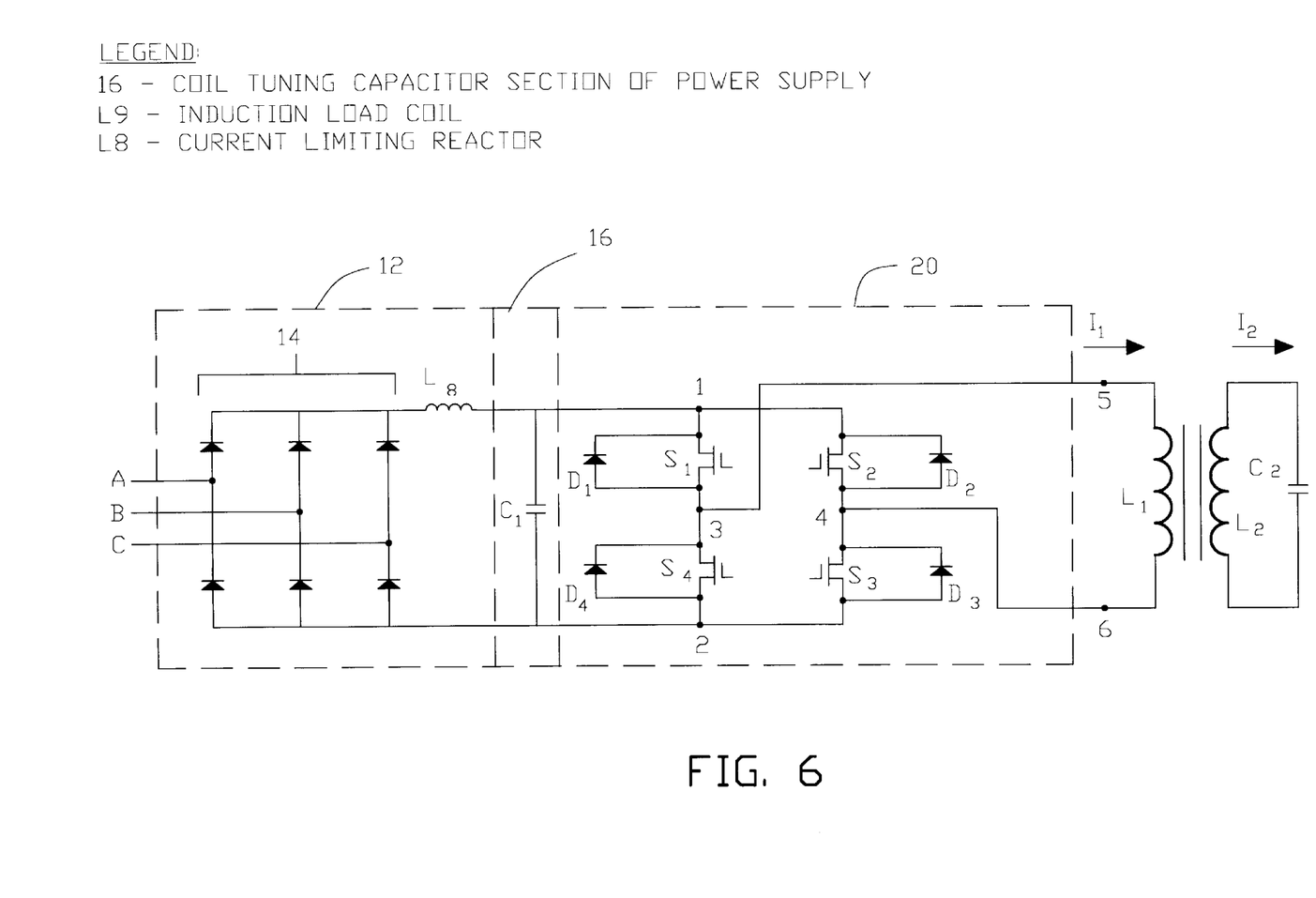
FIG. 6 is a schematic diagram of another example of the power supply of the present invention for use in induction heating or melting applications.

FIG. 6 illustrates a second example of the present invention. In this example, the load coil consists of an active coil $L_1$ and at least one passive coil $L_2$. Coils $L_1$ and $L_2$ may be wound in one of various configurations, such as sequentially or overlapped, to accomplish mutual magnetic coupling of the coils as further described below. Coil $L_1$ is connected to the output of inverter 20. Coil $L_2$ is connected in parallel with resonant tuning capacitor $C_2$ to form a parallel tank resonant circuit. Coil $L_2$ is not physically connected to coil $L_1$. The parallel tank resonant circuit is energized by magnetically coupling coil $L_2$ with the magnetic field generated in coil $L_1$ when current supplied from the output of inverter 20 flows through coil $L_1$.

Figure 7:
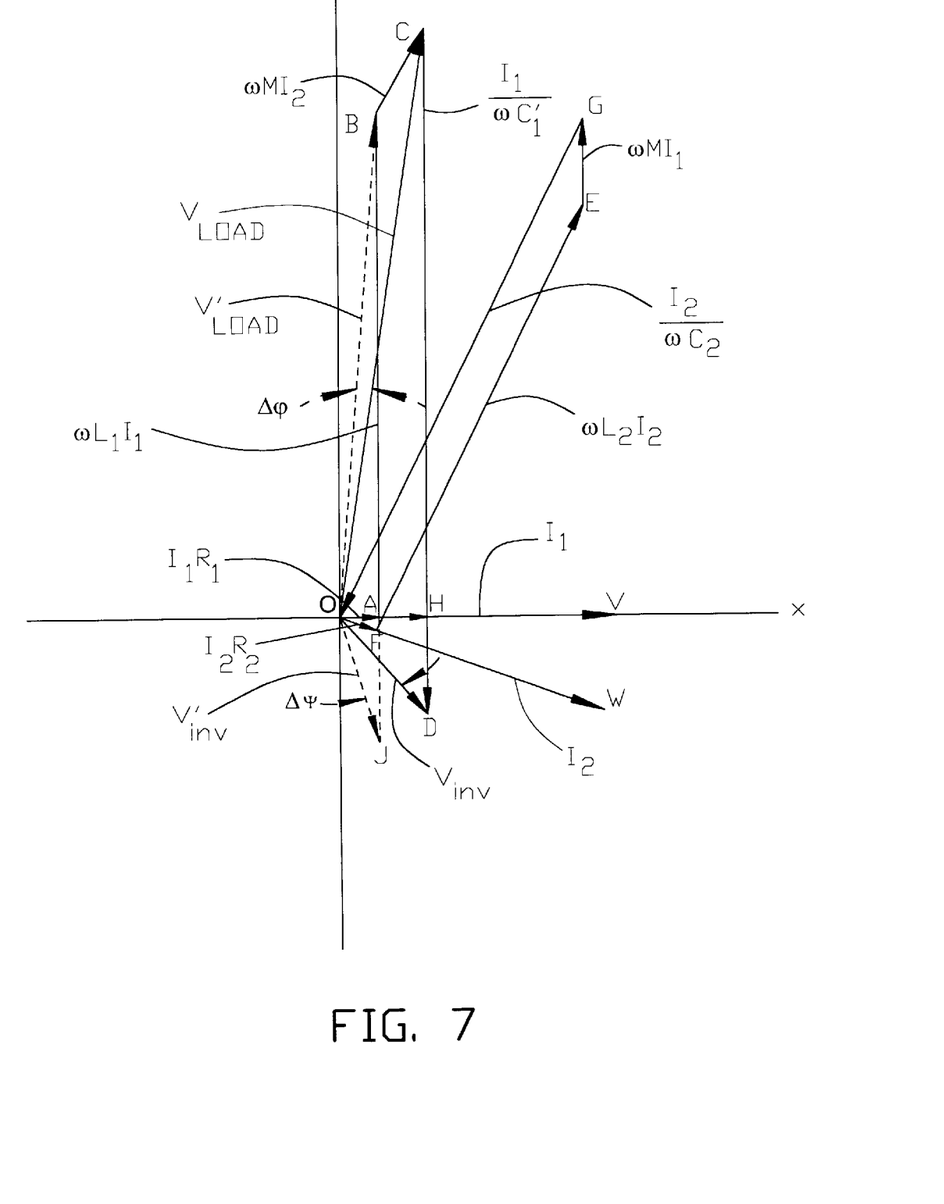
FIG. 7 is a vector diagram illustrating the advantages of an induction heating or melting system with the power supply of the present invention used with the load coil system illustrated in FIG. 6.

The benefit of separate active and passive coils can be further appreciated by the vector diagram shown in FIG. 7. In the figure, with respect to the active coil circuit, vector OV represents current $I_1$ in active coil $L_1$ as illustrated FIG. 6. Vector OA represents the resistive component of the active coil's voltage, $I_1R_1$ ($R_1$ not shown in the figures). Vector AB represents the inductive component of the active coil's voltage, $\omega L_1 I_1$ (where $\omega$ equals the product of $2\pi$ and f, the operating frequency of the power supply). Vector BC represents the voltage, $\omega M I_2$, induced by the passive coil $L_2$ onto active coil $L_1$. The half-wave ripple voltage $V_{C1}$ across capacitor $C_1$ and the switching function of the two switch pairs $S_1/S_3$ and $S_2/S_4$ produce the effect of a pseudo capacitor $C_1'$ connected in series with $L_1$ that would result in a sinusoidal voltage at terminals 5 and 6 in FIG. 6. Vector CD represents the voltage, $I_1/\omega C_1'$, that would appear across this pseudo series capacitor $C_1'$. Vector OD represents the output voltage, $V_{inv}$, of the inverter (terminals 3 and 4 in FIG. 6).

With respect to the passive coil circuit, vector OW represents current $I_2$ in passive coil $L_2$ that is induced by the magnetic field produced by current $I_1$. Vector OF represents the resistive component of the passive coil's voltage, $I_2R_2$ ($R_2$ not shown in the figures). Vector FE represents the inductive component of the active coil's voltage, $\omega L_2 I_2$. Vector EG represents the voltage, $\omega M I_1$, induced by the active coil $L_1$ onto passive coil $L_2$. Vector GO represents the voltage, $I_2/\omega C_2$, on capacitor $C_2$, which is connected across passive coil $L_2$.

The active coil circuit is driven by the voltage source, $V_{inv}$, which is the output of inverter 20, while the passive coil loop is not connected to an active energy source. Since the active and passive coils are mutually coupled, vector BC is added to vector OB, $V'_{LOAD}$, which represents the voltage across an active induction load coil in the absence of a passive capacitive load coil circuit, to result in vector OC, $V_{LOAD}$, which is the voltage across an active load coil with a passive capacitive load coil circuit of the present invention. The resultant load voltage, $V_{LOAD}$, has a smaller lagging power factor angle, $\phi$ (counterclockwise angle between the x-axis and vector OC), than the conventional load coil as represented by vector OB. As illustrated in FIG. 7, there is a power factor angle improvement of $\Delta\phi$.

In the present invention, the inductive impedance in the passive coil is substantially compensated for by the capacitive impedance (i.e., $\omega L_2 \approx 1/\omega C_2$). The uncompensated resistive component, $R_2$, in the passive coil circuit is reflected into the active coil circuit by the mutual inductance between the two circuits, and the effective active coil circuit's resistance is increased, thus improving the power factor angle, or efficiency of the coil system.

Further the power factor angle, $\Psi$, for the output of the inverter improves by $\Delta\Psi$ as illustrated by the angle between vector OJ, $V'_{inv}$ (resultant vector of resistive component vector OA and capacitive component vector AJ in the absence of a passive load coil circuit) and vector OD, $V_{inv}$ (resultant vector of resistive component vector OH and capacitive component vector HD with a passive load coil circuit of the present invention).

In other examples of the invention multiple active and/or passive coil circuits may be used to achieve a desired multiple coil arrangement for a particular application.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Further one skilled in the art may practice the invention by rearranging components to create the desired conditions or accomplish the desired results of the invention. While the examples illustrate operation of the invention in full-bridge voltage-fed power supplies, the invention is applicable to other power supply topologies with appropriate modifications as understood by one who is skilled in the art.

The foregoing examples do not limit the scope of the disclosed invention. The scope of the disclosed invention is further set forth in the appended claims.

What is claimed is:

1. A power supply for inductively heating or melting an electrically conductive material, the power supply comprising:
   a rectifier for converting an ac input power into a dc output power at the output of the rectifier;
   an inverter having an input connected to the output of the rectifier, the inverter converting the dc output power of the rectifier into an ac output current supplied to an output of the power supply, the ac output current having a frequency equal to the operating frequency of the inverter;
   an at least one tuning capacitor connected across the output of the rectifier and the input of the inverter; and
   an at least one inductive load coil connected to the output of the power supply, the at least one inductive load coil having an inductance so that it is at least approximately in resonance with the at least one tuning capacitor at the operating frequency of the inverter, whereby the electrically conductive material is inductively heated or melted by a magnetic field generated from the flow of the ac output current through the at least one inductive load coil.

2. The power supply of claim 1 further comprising a current limiting reactor in series with the output of the rectifier.

3. The power supply of claim 1 wherein pulse width control is used to vary the output voltage of the inverter.

4. The power supply of claim 1 wherein the inverter comprises at least one pair of isolated gate bipolar transistors, each one of the isolated gate bipolar transistors connected anti-parallel with an antiparallel diode, to produce the ac output current.

5. A method of inductively heating or melting an electrically conductive material, the method comprising the steps of:
   rectifying an ac input power into a dc output power;
   inverting the dc output power to produce an output ac current in an inverter at an operating frequency of the inverter;
   connecting the output ac current to an at least one inductive load coil to generate a magnetic field that magnetically couples with the electrically conductive material to inductively heat or melt the electrically conductive material; and
   forming an at least approximately resonant circuit at the operating frequency of the inverter with the at least one inductive load coil and an at least one tuning capacitor disposed across the dc output power.

6. The method of claim 5 further comprising the step of filtering the current of the dc output power.

7. The method of claim 5 further comprising the step of varying the output voltage of the inverter with pulse width control.

8. A power supply for inductively heating or melting an electrically conductive material, the power supply comprising:
   a rectifier for converting an ac input power into a dc output power at the output of the rectifier;
   an inverter having an input connected to the output of the rectifier, the inverter converting the dc output power of the rectifier into an ac output current supplied from an output of the power supply, the ac output current having a frequency equal to the operating frequency of the inverter;
   an at least one tuning capacitor connected across the output of the rectifier and the input of the inverter; and
   an inductive load comprising a first inductive load coil connected to the output of the power supply and an at least one second inductive load coil, the at least one second inductive load coil not connected to the first inductive load coil, the at least one second inductive load coil connected in parallel with an at least one resonant tuning capacitor to form a parallel tank resonant circuit, the second inductive load coil magnetically coupled with the first inductive load coil when the ac output current flows through the first inductive load coil to induce a secondary ac current in the parallel tank resonant circuit, the impedance of the combination of the first inductive load coil and the parallel tank resonant circuit at least approximately in resonance with the impedance of the at least one tuning capacitor at the operating frequency of the inverter, whereby the electrically conductive material is inductively heated by a first magnetic field generated from the flow of the ac output current through the first inductive load coil and a second magnetic field generated from the flow of the secondary ac current in the parallel tank resonant circuit.

9. The power supply of claim 8 further comprising a current limiting reactor in series with the output of the rectifier.

10. The power supply of claim 8 wherein pulse width control is used to vary the output voltage of the inverter.

11. The power supply of claim 8 wherein the inverter further comprises at least one pair of isolated gate bipolar transistors, each one of the isolated gate bipolar transistors connected anti-parallel with an antiparallel diode, to produce the ac output current.

12. A method of inductively heating or melting an electrically conductive material, the method comprising the steps of:
   rectifying an ac input power into a dc output power;
   inverting the dc output power to produce an output ac current in an inverter at an operating frequency of the inverter;
   connecting the output ac current to a first inductive load coil to generate a magnetic field that magnetically couples with the electrically conductive material to inductively heat or melt the electrically conductive material;
   inductively coupling a second inductive load coil with the first magnetic field, the second inductive load coil connected in parallel with an at least one resonant tuning capacitor to form a parallel tank resonant circuit; and
   forming an at least approximately resonant circuit at the operating frequency of the inverter with the impedance of the combination of the first inductive load coil and the parallel tank resonant circuit, and an at least one tuning capacitor disposed across the dc output power.

13. The method of claim 12 further comprising the step of filtering the current of the dc output power.

14. The method of claim 12 further comprising the step of varying the output voltage of the inverter with pulse width control.

* * * * *